(12) United States Patent
Ding et al.

(10) Patent No.: US 9,513,731 B2
(45) Date of Patent: Dec. 6, 2016

(54) TOUCH DISPLAY DEVICE AND A DRIVING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Xue Dong, Beijing (CN); Haisheng Wang, Beijing (CN); Hao Zhang, Beijing (CN); Weijie Zhao, Beijing (CN); Xiaobo Xie, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 122 days.

(21) Appl. No.: 14/385,039

(22) PCT Filed: Dec. 14, 2013

(86) PCT No.: PCT/CN2013/089452
§ 371 (c)(1),
(2) Date: Sep. 12, 2014

(87) PCT Pub. No.: WO2015/007051
PCT Pub. Date: Jan. 22, 2015

(65) Prior Publication Data
US 2016/0132140 A1 May 12, 2016

(30) Foreign Application Priority Data
Jul. 17, 2013 (CN) .......................... 2013 1 0300692

(51) Int. Cl.
*G06F 3/041* (2006.01)

(52) U.S. Cl.
CPC ............. *G06F 3/041* (2013.01); *G06F 3/0416* (2013.01)

(58) Field of Classification Search
CPC ...... G06F 3/041; G06F 3/0412; G06F 3/0416; G06F 1/13338
See application file for complete search history.

(56) References Cited

U.S. PATENT DOCUMENTS

| 2008/0062139 A1* | 3/2008 | Hotelling | G02F 1/13338 345/173 |
| 2012/0056835 A1* | 3/2012 | Choo | G06F 3/0412 345/173 |

(Continued)

FOREIGN PATENT DOCUMENTS

| CN | 101339809 A | 1/2009 |
| CN | 102200857 A | 9/2011 |

(Continued)

OTHER PUBLICATIONS

International Search Report Appln. No. PCT/CN2013/089452; Dated Apr. 14, 2014.

(Continued)

*Primary Examiner* — Premal Patel
(74) *Attorney, Agent, or Firm* — Ladas & Parry LLP

(57) ABSTRACT

The present application relates to a touch display device and a driving method for the same, which can improve the report rate of the touch display device. The driving method for the touch display device comprises: setting a display period to at least comprise two sub-display periods and a touch period to at least comprise two sub-touch periods, and arranging the sub-display periods and the sub-touch periods so that there is one sub-touch period interleaved between two adjacent sub-display periods; by a control signal, controlling the touch display device to enter the sub-touch periods from the sub-display periods, and controlling the touch display device (Continued)

to send out a touch signal; and by the control signal and a driving signal, controlling the touch display device to enter the sub-display periods from the sub-touch periods, and thus enabling the touch display device to display a display picture.

16 Claims, 1 Drawing Sheet

(56) References Cited

U.S. PATENT DOCUMENTS

| | | |
|---|---|---|
| 2012/0154322 A1 | 6/2012 | Yang et al. |
| 2012/0242597 A1* | 9/2012 | Hwang ............... G06F 3/0412 345/173 |
| 2014/0071062 A1* | 3/2014 | Fang .................... G06F 3/0416 345/173 |
| 2015/0194470 A1 | 7/2015 | Hwang |

FOREIGN PATENT DOCUMENTS

| | | |
|---|---|---|
| CN | 102375589 A | 3/2012 |
| CN | 102760405 | 10/2012 |
| CN | 103163666 A | 6/2013 |
| CN | 103207720 A | 7/2013 |
| CN | 103412672 A | 11/2013 |
| CN | 203338322 U | 12/2013 |

OTHER PUBLICATIONS

First Chinese Office Action dated Oct. 10, 2015; Appln. No. 201310300692.7.
International Preliminary Report on Patentability Appln. No. PCT/CN2013/089452; Dated Jan. 19, 2016.
Second Chinese Office Action dated Apr. 5, 2016; Appln. No. 201310300692.7.
Third Chinese Office Action date Sep. 21, 2016; Appln. No. 201310300692.7.

\* cited by examiner

TOUCH DISPLAY DEVICE AND A DRIVING METHOD THEREOF

TECHNICAL FIELD

The present disclosure involves the field of display, and especially, relates to a touch display device and a driving method thereof.

BACKGROUND

Digital devices have been important and indispensable elements in people's living and working. Display devices, as output terminals of video signals of digital devices, are used to directly communicate information to an operator, and thus should be indispensable. With the development of science and technology, the functions of the display devices comprise not only receiving the video signals and display the same, but also controlling command input, that is, current touch display devices input a command directly through a screen, therefore the current touch display devices can even replace accessory devices for inputting, such as a keyboard.

The inventor of the present application finds that, in the prior art, the touch display devices perform scanning and detect whether there is a touch signal from a user only during the refreshing between two display pictures. However, such detecting manner of the touch signal leads to a low report rate of the touch display devices, resulting in that the touch display devices sometimes cannot receive a touch command from the user effectively, which impairs user's use experience.

SUMMARY

The technical problem to be solved by the present application is to provide a touch display device and a driving method thereof, which can improve the report rate of the touch display device.

In the first aspect of the present application, a driving method for a touch display device is provided, wherein one frame of the touch display device comprises a display period and a touch period. The display period comprises at least two sub-display periods, the touch period comprises at least two sub-touch periods, and the sub-display periods and the sub-touch periods are interleaved with each other so that there is one sub-touch period between two adjacent sub-display periods.

A control signal controls the touch display device to enter the sub-touch periods from the sub-display periods, during the sub-touch periods the touch display device sends out a touch signal; on the other hand, the control signal and a drive signal control the touch display device to enter the sub-display periods from the sub-touch periods, and during the sub-display periods the touch display device displays a display picture.

Preferably, when the control signal is a high level signal, the touch display device is controlled to enter the sub-touch periods from the sub-display periods, and during the sub-touch periods the touch display device sends out the touch signal; when the control signal is a low level signal and the drive signal is a high level signal, the touch display device is controlled to enter the sub-display periods from the sub-touch periods, and during the sub-display periods the touch display device displays the pictures.

For example, the display period comprises two sub-display periods, i.e., a first sub-display period and a second sub-display period, the durations of the first sub-display period and the second sub-display period are equal to each other, and during the first sub-display period or the second sub-display period the touch display device displays half of a display picture.

The touch period comprises two sub-touch periods, i.e., a first sub-touch period and a second sub-touch period, and the durations of the first sub-touch period and the second sub-touch period are equal to each other.

For example, the durations of the first sub-touch period and the second sub-touch period are both 2 ms.

In the technical solutions of the embodiments of the present application, a driving method for the touch display device is provided. In the technical solutions of the embodiments of the present application, one frame of the touch display device comprises a display period and a touch period, and the touch period comprises at least two sub-touch periods, therefore the report rate of the touch display device is greatly enhanced, the possibility that the touch display device cannot effectively detect and acquire the user's touch command is lowered, the smoothness of the interaction between the touch display device and the user is improved, and the user's experience is improved.

In the second aspect of the present application, a touch display device is provided. One frame of the touch display device comprises a display period and a touch period. The display period comprises at least two sub-display periods, the touch period comprises at least two sub-touch periods, and the sub-display periods and the sub-touch periods are interleaved with each other so that there is one sub-touch period between two adjacent sub-display periods.

The touch display device comprises a display module, a touch module and a control module. The control module sends out a control signal which controls the touch module to send out a touch signal, and thus enabling the touch display device to enter the sub-touch periods from the sub-display periods; on the other hand, the control module sends out the control signal, and at the same time the display module sends out a drive signal, which controls the display module to display a display picture, and thus enabling the touch display device to enter the sub-display periods from the sub-touch periods.

Preferably, when the control signal sent out by the control module is a high level signal, the touch module is controlled to send out a touch signal, and thus enabling the touch display device to enter the sub-touch periods from the sub-display periods; when the control signal sent out by the control module is a low level signal and the drive signal sent out by the display module is a high level signal, the display module is controlled to display the display pictures, and thus enabling the touch display device to enter the sub-display periods from the sub-touch periods.

For example, the display period comprises two sub-display periods, i.e., a first sub-display period and a second sub-display period, and the durations of the first sub-display period and the second sub-display period are equal to each other, and during the first sub-display period or the second sub-display period the display module displays half of a display picture; and The touch period comprises two sub-touch periods, i.e., a first sub-touch period and a second sub-touch period, and the durations of the first sub-touch period and the second sub-touch period are equal to each other.

For example, the durations of the first sub-touch period and the second sub-touch period are both 2 ms.

BRIEF DESCRIPTION OF THE DRAWINGS

Other features and advantages of the present application will be described referring to the accompanied figures. In the description, reference is made to the drawings which aim to show the preferable embodiments of the present application. It should be understood that such embodiments do not represent the full scope of the present application.

DETAILED DESCRIPTION

Figure 1:
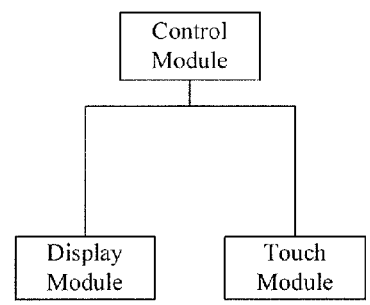
FIG. 1 is a schematic diagram illustrating the structure of the touch display device according to one embodiment of the present application.

In order to make objects, technical solutions and advantages of the embodiments of the invention apparent, the technical solutions of the embodiments of the present application will be described clearly and fully in connection with the drawings related to the embodiments of the invention. It is obvious that the described embodiments are just a part but not all of the embodiments of the invention. Any other embodiment(s) which can be achieved by those skilled in the art based on the described embodiments herein and without any inventive work should be within the scope of the present application.

Unless otherwise defined, the technical terms or scientific terms used herein should be the general meanings understood by those ordinary skilled in the field of the present application. The terms "first", "second" and similar terms used in this description and claims of this patent application do not imply a sequence, amount or importance, and are only used to distinguish one part from another. Likewise, similar terms such as "one", "a" or "an" do not imply limitation on amount while may be intended to include the plural forms as well. Terms such as "including" or "containing", etc. refer to that an element or article preceding the terms "including" or "containing" covers the elements, articles and equivalents thereof listed after the terms "including" or "containing", and do not exclude other elements or articles. Terms such as "connect" or "couple" and the like are not limited to physical or mechanical connections, and can comprise electrical connection, no matter direct or indirect. Terms such as "upper", "lower", "left" and "right" are only intended to represent relative position relationships, when the absolute position of a described object is changed, the relative position relationships may be changed correspondingly.

The embodiments of the present application provide a driving method for a touch display device, wherein one frame of the touch display device comprises a display period and a touch period, wherein, the display period at least comprises two sub-display periods, the touch period at least comprises two sub-touch periods, and the sub-display periods and the sub-touch periods alternate each other so that there is one sub-touch period interleaved between two adjacent sub-display periods.

The touch display device is controlled by means of a control signal so as to enable the touch display device to enter a sub-touch period from a sub-display period, in the sub-touch period, the touch display device is controlled by means of the control signal to send out a touch signal, so as to detect a user's touch on the touch display device; on the other hand, the touch display device is controlled by means of the control signal and a drive signal so as to enable the touch display device to enter a sub-display periods from a sub-touch periods, in the sub-display periods, by means of a drive signal and the control signal, the touch display device is enabled to display the display picture.

Wherein, in order to prevent the touch signal from disturbing the normal display of the display picture, when the touch display device is in the sub-touch periods, under the control of the control signal, the touch display device sends out the touch signal to detect user's touch on the touch display device, at the same time, the touch display device stops displaying the display picture; correspondingly, when the touch display device is in the sub-display periods, under the control of the control signal and the drive signal, the touch display device stops sending out the touch signal and continues the displaying of the display picture which has not been completely displayed.

In the technical solutions of the embodiments of the present disclosure, one frame of the touch display device comprises a display period and a touch period, and the touch period comprises at least two sub-touch periods, so that the touch display device performs at least two touch detections during one frame, and thus the report rate of the touch display device is greatly enhanced, and the possibility that the touch display device cannot effectively detect and acquire the user's touch command is lowered, and the interaction between the touch display device and the user is smoothened, therefore improving the user's experience.

In the period of one frame of the touch display device, the display period can comprise any number of sub-display periods, likewise, the touch period can also comprise any number of sub-touch periods, as long as the number of the sub-display periods and the number of the sub-touch periods in one frame are equal or are different by one so that there is one sub-touch period interleaved between two adjacent sub-display periods.

For example, in the period of one frame, the display period comprises three sub-display periods, and the touch period comprises two sub-touch periods, these three sub-display periods and these two sub-touch periods are distributed alternately, and thus one frame of the touch display device starts from a sub-display period and ends at a sub-display period; or, in the period of one frame, the display period comprises four sub-display periods, and the touch period comprises four sub-touch periods, these four sub-display periods and these four sub-touch periods alternate with each other, and thus one frame of the touch display device starts from a sub-display period and ends at a sub-touch period.

While the display period can comprise any number of sub-display periods and the touch period can also comprise any number of sub-touch periods in the period of one frame of the touch display device. However, if there are too many sub-display periods and sub-touch periods in the period of one frame, more strict requirements will be imposed on the hardware of the touch display device, which is disadvantageous to popularization and implementation of the driving method. Therefore, in the embodiments of the present disclosure, preferably, in the period of one frame, the display period comprises two sub-display periods, i.e., a first sub-display period and a second sub-display period, and correspondingly, the touch period comprises two sub-touch periods, i.e., a first sub-touch period and a second sub-touch period.

As to the existing touch display devices, the display frequency of displaying picture is 60 Hz, since the detection of the touch signal is performed only between two displayed display pictures, the report rate is also 60 Hz. In the embodiments of the present disclosure, in the period of one frame of the touch display device, the touch period comprises two sub-touch periods, i.e., the first sub-touch period and the second sub-touch period, detection of the touch is performed in both of the two sub-touch periods, and thus the report rate of the touch display device is 120 Hz which corresponds to double of the report rate in the prior art. Therefore, the possibility that the touch display device cannot effectively detect and acquire the user's touch command is lowered, and the interaction between the touch display device and the user is smoothened, which improves the user's experience. On the other hand, the report rate of 120 Hz can fully meet user's requirement relating to usage, and a higher report rate may debase the display effect of the touch display device and add the working load of the touch display device, resulting in that the power of the touch display device is increased and the user's experience is impaired.

The display panels of existing touch display devices are mostly liquid crystal display panels, and the scanning of the display pictures is achieved by a gate driving circuit which comprises a plurality of cascaded gate shift register units. For example, the liquid crystal display panel is constituted by a matrix of pixels arranged in a horizontal direction and a vertical direction, the video information to be displayed is applied to corresponding data lines as gray-scale signals. In a certain period of time, the cascaded gate shift register units sequentially output signals, so as to sequentially scan respective pixel rows from the first row to the last row. During the scanning of the respective pixel rows, the storage capacitors of the respective pixel rows are charged to corresponding level values which in turn is kept till the next scanning.

At the beginning of displaying one display picture, the touch display device sends out a drive signal to drive the cascaded gate shift register units, and the drive signal in the cascaded gate shift register units are delivered cascade by cascade. Specifically, after the first cascade of gate shift register unit receives the drive signal from the touch display device and then sends a gate line signal to the gate line corresponding to the first cascade of gate shift register unit, the drive signal is delivered to the second cascade of gate shift register unit. Delivering the drive signal in such a cascade by cascade way allow the liquid crystal display panel to be scanned and refreshed row-by-row.

In the embodiments of the present application, as there is one sub-touch period inserted between two sub-display periods, and in the sub-touch period the cascaded gate shift register units do not work, that is, the action of delivering the drive signal from a certain gate shift register unit to the next cascade of gate shift register unit is suspended, so that the drive signal stays in this certain gate shift register unit. While the gate shift register unit's capacity for storaging electric charge is poor, and thus the time for which the drive signal can be maintained in the certain gate shift register unit is very short. Therefore, the drive signal may possibly disappear in the sub-touch period, so that this cascade of gate shift register unit cannot operate normally when the touch display device enters the sub-display periods from the sub-touch periods to display the picture again.

Therefore, after the sub-touch periods end, at the beginning of the sub-display periods, the touch display device needs to send the drive signal to the gate shift register unit among the cascaded gate shift register units that firstly participates in the scanning, so as to drive the cascaded gate shift register units to work.

In order to facilitate driving the cascaded gate shift register units, in the embodiments of the present application, for example, the duration of the first sub-display period is equal to that of the second sub-display period. Further, in the first sub-display period or the second sub-display period, the touch display device displays a half of a display picture, that is, the display picture displayed by the touch display device in the first sub-display period or the second sub-display period is only a half of the whole display picture that needs to be displayed; correspondingly, the first sub-touch period and the second sub-touch period contained in one touch period are equal to each other in duration.

For example, in the embodiments of the present application, provided that the touch display device includes n cascaded gate shift register units, in the first sub-display period, the control signal is a low level signal, a drive signal is inputted into the first gate shift register unit among the n cascaded gate shift register units wherein the drive signal corresponds to a digital carry signal (STV) of the shift register unit in the prior art, and thus the first n/2 gate shift register units are driven. When the control signal changes to a high level signal, resulting in that the first sub-display period ends and the touch display device enters the first sub-touch period. During the first sub-touch period, the control signal controls the touch display device to send a touch signal to detect a user's touch on the touch display device, and the cascaded gate shift register units suspend working.

Subsequently, the control signal changes to a low level signal, resulting in that the first sub-touch period ends and the touch display device is made to enter the second sub-display period, at this moment, the cascaded gate shift register units have displayed the first half of the display picture during the first sub-display period, this means that upon the entry into the second sub-display period, the touch display device needs to input to the $(1+n/2)^{th}$ cascade of gate shift register unit the drive signal which corresponds to an STV on signal enabling the shift register units to go on working, so that the cascaded gate shift register units can work normally and continue to display the remained half of the display picture.

In the embodiments of the present application, the control signal preferably ranges from 1.8V to 5V. The drive signal is equivalent to the STV signal of the gate shift register units. However, in the embodiments of the present application, the drive signal is inputted to the gate driving circuit twice in the period of one frame, and thus the shift register units are enabled two times in the period of one frame.

In the prior art, the time interval between two display pictures for scanning and detecting the touch signal is 4 ms. In the embodiments of the present application, the first sub-touch period and the second sub-touch period, for example, can be set to 2 ms, which means that after each entry into the sub-touch periods, within this 2 ms, the touch display device will continuously send the touch signal to detect user's touch.

The first sub-touch period and the second sub-touch period are only 2 ms, and thus the report rate of the touch module may be increased on the premise that the display effect of the picture displayed by the touch display device will not be affected.

Furthermore, another embodiment of the present application discloses a touch display device, wherein one frame of the touch display device comprises a display period and a touch period.

As shown in FIG. 1, the touch display device comprises a display module for displaying a picture to be displayed, a touch module which sends a touch signal and a control module, wherein the control module sends a control signal which controls the touch module to send out the touch signal so as to enable the touch display device to enter the sub-touch periods from the sub-display periods; on the other hand, the control module sends out the control signal while the display module sends out a drive signal which controls the display module to display the display pictures so as to enable the touch display device to enter the sub-display periods from the sub-touch periods.

Wherein, the display period at least comprises two sub-display periods, the touch period at least comprises two sub-touch periods, and the sub-display periods and the sub-touch periods are interleaved with each other so that there is a sub-touch period between two adjacent sub-display periods.

For example, if the display panel of the touch display device is a liquid crystal display panel, the scanning of the display picture is performed by a gate driving circuit included in the display module, and the gate driving circuit comprises a plurality of cascaded gate shift register units.

In the embodiments of the present application, the display period comprises two sub-display periods, i.e., a first sub-display period and a second sub-display period, and the durations of the first sub-display period and the second sub-display period are equal to each other, and the display module displays a half of a display picture during the first sub-display period or the second sub-display period.

Similarly, the touch period comprises two sub-touch periods, i.e., a first sub-touch period and a second sub-touch period, and the durations of the first sub-touch period and the second sub-touch period are equal to each other.

Figure 2:
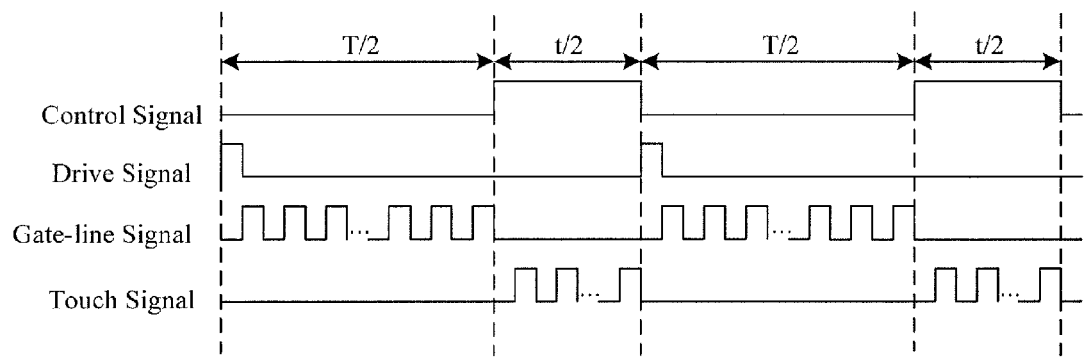
FIG. 2 is a diagram illustrating the operation time sequence of the touch display device according to one embodiment of the present application.

As shown in FIG. 2, one frame of the touch display device comprises a display period T and a touch period t, in the prior art, the display period T is 16.7 ms, and the touch period is 4 ms. Therefore, in the embodiments of the present application, for example, the durations of the first sub-display period and the second sub-display period can both be T/2, about 8.35 ms; the durations of the first sub-touch period and the second sub-touch period can both be t/2, i.e., 2 ms.

When each display picture starts to be displayed, the touch display device enters the first sub-display period, the control module sends out a low level control signal, and the display module transmits the drive signal to the first cascade of gate shift register unit among the n cascaded gate shift register units so as to drive the cascaded gate shift register units to successively send out a gate line signal for scanning. As a period of T/2 elapses, the display module in the touch display device has displayed the first half of the display picture, that is, the first to the $n/2^{th}$ cascades of the gate shift register units have participated in scanning the display picture.

Then, the control module sends out a high level control signal so as to enable the touch display device to enter the first sub-touch period. Therefore, the touch module sends out the touch signal to detect the user's touch on the touch display device, at the same time the scanning of the cascaded gate shift register units is suspended. After a period of t/2 elapses, the control module sends out a low level control signal so as to enable the touch display device to enter the second sub-display period from the first sub-touch period. In order to allow the display module to go on displaying the remained half of the display picture, the display module outputs to the $(1+n/2)^{th}$ cascade of gate shift register unit the drive signal, which is equivalent to an STV enable signal making the shift register units go on working, so as to drive the remained gate shift register units to take part in the scanning and ensure the normal display of the display picture.

After a period of T/2 elapses, the control module sends out a high level control signal again so that the touch display device enters the second sub-touch period. During the second sub-touch period, the touch display device performs the same operations as those done in the first sub-touch period, that is, it sends out the touch signal to detect the user's touch. Then, after another period of t/2 elapses, that is, when the second sub-touch period ends, the driving process of one frame performed by the touch display module is finished.

Wherein, the control module in the embodiments of the present application may be implemented based on the driving circuit of an existing touch display device.

It should be noted that the display module can only output one channel of drive signals to one gate shift register unit, for example, it only outputs the drive signal to the $(1+n/2)^{th}$ cascade of gate shift register unit; however, in order to improve the response rate of the display module, it may also output a plurality of channels of drive signals to a plurality of gate shift register units correspondingly, wherein, there are little time difference between each channel of drive signals. For example, corresponding drive signals are outputted to the $(1+n/2)^{th}$, the $(2+n/2)^{th}$, the $(3+n/2)^{th}$ and the $(4+n/2)^{th}$ cascades of gate shift register units respectively. Wherein the drive signal corresponding to the $(2+n/2)^{th}$ cascade of gate shift register unit lags behind the drive signal corresponding to the $(1+n/2)^{th}$ cascade of gate shift register unit, similarly, the drive signal corresponding to the $(3+n/2)^{th}$ cascade of gate shift register unit lags behind the drive signal corresponding to the $(2+n/2)^{th}$ cascade of gate shift register unit, the drive signal corresponding to the $(3+n/2)^{th}$ cascade of gate shift register unit lags behind the drive signal corresponding to the $(4+n/2)^{th}$ cascade of gate shift register unit, and the time differences between each channel of drive signals are equal to each other. Subsequently, the $(1+n/2)^{th}$ cascade delivers the obtained drive signal to the $(5+n/2)^{th}$ cascade, and similarly, the $(2+n/2)^{th}$ cascade delivers the obtained drive signal to the $(6+n/2)^{th}$ cascade, the $(3+n/2)^{th}$ cascade delivers the obtained drive signal to the $(7+n/2)^{th}$ cascade, and the $(4+n/2)^{th}$ cascade delivers the obtained drive signal to the $(8+n/2)^{th}$ cascade, until the touch display device completes displaying the display picture.

The touch display device provided in the embodiments of the present application may be any product or component having a display function, such as liquid crystal panel, electronic paper, OLED panel, mobile phone, flat computer, television, display, notebook computer, digital photo frame and navigator, etc.

The foregoing description are specific embodiments of the invention, while the protection scope of the present application is not limited to this. Any variation or replacement which may be easily conceived by those skilled in the art within the scope disclosed by the present application should all be contained within the protection scope of the present application. Therefore, the protection scope of the present application shall be based on the claims.

The invention claimed is:

1. A driving method for a touch display device, wherein one frame of the touch display device comprises a display period and a touch period, the method comprising,
setting the display period to at least comprise a first sub-display period and a second sub-display period, and the touch period to at least comprise a first sub-touch period and a second sub-touch period, and interleaving one sub-touch period between two adjacent sub-display periods;
controlling the touch display device by a control signal and a drive signal to enable the touch display device to enter the sub-display periods from the sub-touch periods, wherein the drive signal is input to a gate shift register unit which is cascaded and delivered cascade by cascade, so as to display a display picture during the sub-display periods;

controlling the touch display device by the control signal to enable the touch display device to enter the sub-touch periods from the sub-display periods, and during the sub-touch periods, controlling the touch display device by the control signal to enable the touch display device to send out a touch signal and the gate shift register unit to suspend; and wherein, the drive signal is input to a first cascade of gate shift register unit and delivered cascade by cascade, so as to display the first part of the display picture during the first sub-display period; the drive signal stays in the certain cascade of the gate shift register unit during the sub-touch period; and the drive signal continues to be input to a next cascade of gate shift register unit and delivered cascade by cascade, so as to display the following part of the display picture during the second sub-display period.

2. The driving method of a touch display device according to claim 1, wherein, by the control signal which is a high level signal, the touch display device is controlled to enter the sub-touch periods from the sub-display periods, and the touch display device is controlled to send out the touch signal during the sub-touch periods; by the control signal which is a low level signal and the drive signal which is a high level signal, the touch display device is controlled to enter the sub-display periods from the sub-touch periods to display the display picture during the sub-display periods.

3. The driving method of a touch display device according to claim 2, wherein, the display period comprises two sub-display periods, that is, the first sub-display period and the second sub-display period, and the durations of the first sub-display period and the second sub-display period are equal to each other, and the touch display device displays half of the display picture during the first sub-display period or the second sub-display period; and the touch period comprises two sub-touch periods, i.e., the first sub-touch period and the second sub-touch period, and the durations of the first sub-touch period and the second sub-touch period are equal to each other.

4. The driving method of a touch display device according to claim 3, wherein, the durations of the first sub-touch period and the second sub-touch period are both 2 ms.

5. The driving method of a touch display device according to claim 1, wherein, the durations of the first sub-display period and the second sub-display period are equal to each other, and the touch display device displays half of the display picture during the first sub-display period or the second sub-display period; and the durations of the first sub-touch period and the second sub-touch period are equal to each other.

6. The driving method of a touch display device according to claim 5, wherein, the durations of the first sub-touch period and the second sub-touch period are both 2 ms.

7. The driving method of a touch display device according to claim 1, wherein, during the sub-touch period, the touch display device does not display the display picture.

8. The driving method of a touch display device according to claim 1, wherein, during the sub-display period, the touch display device does not send out the touch signal.

9. A touch display device, one frame of the touch display device comprising a display period and a touch period, wherein, the display period at least comprises a first sub-display period and a second sub-display period, the touch period at least comprises a first sub-touch period and a second sub-touch period and there is one sub-touch period interleaved between two adjacent sub-display periods;

the touch display device comprises a display circuit, a touch circuit and a control circuit, and the control circuit sends out a control signal, and at the same time, the display circuit sends out a drive signal, which controls the display circuit to display a display picture, wherein the drive signal is input to a gate shift register unit which is cascaded and delivered cascade by cascade, so that the touch display device enters the sub-display periods from the sub-touch periods; the control circuit sends out the control signal which controls the touch circuit to send out a touch signal and the gate shift register unit to suspend, so that the touch display device enters the sub-touch periods from the sub-display periods; and wherein, the drive signal is input to a first cascade of gate shift register unit and delivered cascade by cascade, so as to display the first part of the display picture during the first sub-display period; the drive signal stays in a certain cascade of the gate shift register unit during the sub-touch period; and the drive signal continues to be input to a next cascade of the gate shift unit and delivered cascade by cascade, so as to display the following part of the display picture during the second sub-display period.

10. The touch display device according to claim 9, wherein, when the control signal sent out by the control circuit is a high level signal, the touch circuit is controlled to send out the touch signal, so that the touch display device enters the sub-touch periods from the sub-display periods; when the control signal sent out by the control circuit is a low level signal and the drive signal sent out by the display circuit is a high level signal, the display circuit is controlled to display the display picture, so that the touch display device enters the sub-display periods from the sub-touch periods.

11. The touch display device according to claim 10, wherein, the display period comprises two sub-display periods, i.e., the first sub-display period and the second sub-display period, and the durations of the first sub-display period and the second sub-display period are equal to each other, and the display circuit displays half of the display picture during the first sub-display period or the second sub-display period; and the touch period comprises two sub-touch periods, i.e., the first sub-touch period and the second sub-touch period, and the durations of the first sub-touch period and the second sub-touch period are equal to each other.

12. The touch display device according to claim 11, wherein, the durations of the first sub-touch period and the second sub-touch period are both 2 ms.

13. The touch display device according to claim 9, wherein, the durations of the first sub-display period and the second sub-display period are equal to each other, and the display circuit displays half of the display picture during the first sub-display period or the second sub-display period; and the durations of the first sub-touch period and the second sub-touch period are equal to each other.

14. The touch display device according to claim 13, wherein, the durations of the first sub-touch period and the second sub-touch period are both 2 ms.

15. The touch display device according to claim 9, wherein, during the sub-touch period, the display circuit does not display the display picture.

16. The touch display device according to claim 9, wherein, during the sub-display period, the touch circuit does not send out touch signal.

\* \* \* \* \*